United States Patent
Määttanen et al.

(10) Patent No.: US 11,451,358 B2
(45) Date of Patent: Sep. 20, 2022

(54) MEDIUM ACCESS CONTROL (MAC) SIGNALING FOR REFERENCE SIGNAL ACTIVATION AND QUASI CO-LOCATION INDICATION IN WIRELESS COMMUNICATION NETWORKS

(71) Applicant: TELEFONAKTIEBOLAGET LM ERICSSON (PUBL), Stockholm (SE)

(72) Inventors: Helka-Liina Määttanen, Helsinki (FI); Siva Muruganathan, Stittsville (CA); Stephen Grant, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/764,684

(22) PCT Filed: Nov. 16, 2018

(86) PCT No.: PCT/IB2018/059067
§ 371 (c)(1),
(2) Date: May 15, 2020

(87) PCT Pub. No.: WO2019/097482
PCT Pub. Date: May 23, 2019

(65) Prior Publication Data
US 2020/0412506 A1    Dec. 31, 2020

Related U.S. Application Data

(60) Provisional application No. 62/587,465, filed on Nov. 16, 2017.

(51) Int. Cl.
*H04L 5/00* (2006.01)

(52) U.S. Cl.
CPC .................... *H04L 5/0051* (2013.01)

(58) Field of Classification Search
None
See application file for complete search history.

(56) References Cited

U.S. PATENT DOCUMENTS

| 2017/0078955 A1 | 3/2017 | Cheng |
| 2019/0069285 A1* | 2/2019 | Chandrasekhar .... H04B 7/0695 |

(Continued)

FOREIGN PATENT DOCUMENTS

| CN | 10721080 A1 | 9/2019 |
| WO | 2017048049 A1 | 3/2017 |

(Continued)

OTHER PUBLICATIONS

Samsung, "On Beam Indication" 3GPP TSG RAN WG1, Meeting 92bis, R1-1717627, Prague Czech, Oct. 9-13, 2017, pp. 1-10.

(Continued)

*Primary Examiner* — Diane L Lo
(74) *Attorney, Agent, or Firm* — Ericsson Inc.

(57) ABSTRACT

Techniques are provided to control the activation of resource sets via medium access control (MAC) signaling. In some aspect, a radio network node generates a MAC message comprising a first field indicating whether a second field is present, or absent, in the MAC message, the second field identifying one or more resource sets among a plurality of resource sets which are to be activated or deactivated, and a third field comprising quasi co-location (QCL) information. The radio network node then transmits the MAC message to a wireless device.

20 Claims, 9 Drawing Sheets

(56) References Cited

U.S. PATENT DOCUMENTS

2019/0190669 A1* 6/2019 Park .................. H04L 5/0053
2020/0288479 A1* 9/2020 Xi ..................... H04B 7/02
2020/0395990 A1* 12/2020 Nam ................. H04B 7/0626

FOREIGN PATENT DOCUMENTS

WO 2017167290 A1 10/2017
WO 2017180049 A1 10/2017

OTHER PUBLICATIONS

Samsung, Introducing Action/Deactivation CSI-RS MAC CE for eFD-MIMO, 3GPP TSG-RAN Meeting #97, R2-1702084, Athens Greece, Feb. 13-17, 2017, pp. 1-4.

Meida Tek Inc., "Beam Management and Beam Recovery in MAC", 3GPP TSG-RAN WG2 #99bis, R2-1710870, Prague Czech, Oct. 9-13, 2017, pp. 1-4.

3GPP TS 36.321 V14.4.0 (Sep. 2017)_3rd Generation Partnership Project; Technical Specification Group Radio Access Network; Evolved Universal Terrestrial Radio Access (E-UTRA); Medium Access Control (MAC) protocol specification (Release 14). www.3gpp.org.

3GPP TS 36.331 V14.4.0 (Sep. 2017)—3rd Generation Partnership Project; Technical Specification Group Radio Access Network; Evolved Universal Terrestrial Radio Access (E-UTRA); Radio Resource Control (RRC); Protocol specification (Release 14). www.3gpp.org.

3GPP TS 38.321 V1.0.0 (Sep. 2017)—3rd Generation Partnership Project; Technical Specification Group Radio Access Network; NR; Medium Access Control (MAC) protocol specification (Release 15). www.3gpp.org.

3GPP TS 38.331 V0.1.0 (Oct. 2017)—3rd Generation Partnership Project; Technical Specification Group Radio Access Network; NR; Radio Resource Control (RRC); Protocol specification (Release 15). www.3gpp.org.

ISR/WO issued on Applicant's corresponding PCT International Application PCT/IB2018/059067.

Office Action with Search Report issued on Applicant's corresponding Chinese Patent Application No. 201880074105.8 dated Sep. 27, 2021.

* cited by examiner

MEDIUM ACCESS CONTROL (MAC) SIGNALING FOR REFERENCE SIGNAL ACTIVATION AND QUASI CO-LOCATION INDICATION IN WIRELESS COMMUNICATION NETWORKS

RELATED APPLICATIONS

The present application claims the benefits of priority of U.S. Provisional Patent Application No. 62/587,465; entitled "MEDIUM ACCESS CONTROL (MAC) SIGNALING FOR REFERENCE SIGNAL ACTIVATION AND CONTROL IN WIRELESS COMMUNICATION NETWORKS"; and filed at the United States Patent and Trademark Office on Nov. 16, 2017; the content of which is incorporated herein by reference.

TECHNICAL FIELD

The present description generally relates to wireless communications and wireless communication networks, and more particularly relates to activation and control of reference signals with medium access control (MAC) signaling in wireless communication networks.

BACKGROUND

In LTE, until Release 13, all reference signals (RSs) that a UE would use for CSI calculation (CRS and CSI-RS) were non-precoded such that UE was able to measure the raw channel and calculate CSI feedback including preferred precoding matrix based on that. As the number of transmit (Tx) antenna ports increases, the amount of feedback becomes larger. In LTE Release 10, when support for 8Tx closed loop precoding was introduced, a double codebook approach was introduced where UE would first select a wideband coarse precoder and then select a second codeword per subband. Another possible approach is that network beamforms the CSI-RS and the UE calculates CSI feedback using the beamformed CSI-RS. This approach was adopted in LTE Release 13 as one option for the FD-MIMO as described next.

Beamformed Reference Signals from LTE

Release 13 FD-MIMO specification in LTE supports an enhanced CSI-RS reporting called Class B for beamformed CSI-RS. Therein, an LTE RRC_CONNECTED UE can be configured with K beams (where $1<K\leq 8$) where each beam can consist of 1, 2, 4 or 8 CSI-RS ports. For CSI feedback purposes (PMI, RI and CQI), there is a CSI-RS Resource Indicator per CSI-RS. As part of the CSI, the UE reports CSI-RS index (CRI) to indicate the preferred beam where the CRI is wideband. Other CSI components such as RI/CQI/PMI are based on legacy codebook (i.e. Release 12) and CRI reporting periodicity is an integer multiple of the RI reporting periodicity. An illustration of beamformed CSI-RS is given in FIG. 1. In the figure, the UE reports CRI=2 which corresponds to RI/CQI/PMI being computed using "Beamformed CSI-RS 2".

For Release 14 eFD-MIMO, non-periodic beamformed CSI-RS with two different sub-flavors was introduced. The two sub-flavors are aperiodic CSI-RS and semi-persistent CSI-RS. In both these flavors, the CSI-RS resources are configured for the UE as in Release 13 with K CSI-RS resources, and activation of N out of K CSI-RS resources ($N\leq K$) with a MAC CE is specified. Alternatively stated, after the K CSI-RS resources are configured to be aperiodic CSI-RS or semi-persistent CSI-RS, the UE waits for MAC CE activation of N out of K CSI-RS resources. In the case of aperiodic CSI-RS, in addition to MAC CE activation, a DCI trigger is sent to the UE so that one of the activated CSI-RS resources is selected by the UE for CSI computation and subsequent reporting. In the case of semi-persistent CSI-RS, once the CSI-RS resources are activated by MAC CE, the UE can use the activated CSI-RS resources for CSI computation and reporting.

The MAC CE activation/deactivation command is specified in Section 5.19 of 3GPP TS 36.321 V14.4.0 where the specification text is reproduced below:

The network may activate and deactivate the configured CSI-RS resources of a serving cell by sending the Activation/Deactivation of CSI-RS resources MAC control element described in subclause 6.1.3.14. The configured CSI-RS resources are initially deactivated upon configuration and after a handover.

The abovementioned Section 6.1.3.14 of 3GPP TS 36.321 V14.4.0 is reproduced below:

The Activation/Deactivation of CSI-RS resources MAC control element is identified by a MAC PDU subheader with LCID as specified in table 6.2.1-1. It has variable size as the number of configured CSI process (N) and is defined in FIG. 6.1.3.14-1 (see FIG. 11). Activation/Deactivation CSI-RS 6.1.3.14-2 (see FIG. 12) and activates or deactivates CSI-RS resources for a CSI process. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements is defined as follows:

$R_i$: this field indicates the activation/deactivation status of the CSI-RS resources associated with CSI-RS-ConfigNZPId i for the CSI-RS process. The $R_i$ field is set to "1" to indicate that CSI-RS resource associated with CSI-RS-ConfigNZPId i for the CSI-RS process shall be activated. The $R_i$ field is set to "0" to indicate that the CSI-RS-ConfigNZPId i shall be deactivated;

The MAC activation was introduced in LTE to be able to configure the UE with more CSI-RS resources than the maximum number of CSI-RS resources the UE is able to support for CSI feedback. The MAC CE would then selectively activate up to the maximum number of CSI-RS resources supported by the UE for CSI feedback. The benefit of MAC CE activation for CSI-RS is that the network may, without the need to reconfigure the UE with RRC signaling, activate another set of N CSI-RS resources among the K resources configured for the UE.

Beamforming in NR

For NR, all reference signals may be beamformed. In NR, the synchronization sequences (NR-PSS/NR-SSS) and PBCH which includes DMRS constitute a so-called SS Block. An RRC_CONNECTED UE trying to access a target cell should assume that the SS Block may be transmitted in the form of repetitive bursts of SS Block transmissions (denoted as "SS Burst"), wherein such a burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. As shown in FIG. 2, in single beam scenarios, the network could configure time-repetition within one SS Burst in a wide beam. In multi-beam scenarios, at least some of these signals and physical channels (e.g. SS Block) would be transmitted in multiple beams, which could be done in different manners depending on network implementation, as shown in FIG. 2.

Which of these three alternatives to implement is a network vendor choice. That choice depends on the tradeoff between: i) the overhead caused by transmitting periodic and always on narrow beam sweepings, and ii) the delays and signaling needed to configure the UE to find a narrow beam for PDSCH/PDCCH. The implementation shown in the upper figure in FIG. 2 prioritizes i), while the implementation shown in the bottom figure in FIG. 2 prioritizes ii). The figure in the middle case is an intermediate case, where a sweeping of wide beams is used. In that case, the number of beams to cover the cell is reduced, but in some cases an additional refinement is needed for narrow gain beamforming of PDSCH.

CSI-RS and CSI Reporting in NR

In NR, the following types of CSI reporting are supported:

Periodic CSI Reporting: CSI is reported periodically by the UE. Parameters such as periodicity and slot offset are configured semi-statically, by higher layer signaling from the gNB to the UE.

Aperiodic CSI Reporting (AP CSI Reporting): This type of CSI reporting involves a single-shot (i.e., one time) CSI report by the UE which is dynamically triggered by the gNB, e.g., by the DCI in PDCCH. Some of the parameters related to the configuration of the aperiodic CSI report are semi-statically configured from the gNB to the UE but the triggering is dynamic.

Semi-Persistent CSI Reporting: Similar to periodic CSI reporting, semi-persistent CSI reporting has a periodicity and slot offset which may be semi-statically configured by the gNB to the UE. However, a dynamic trigger from gNB to UE may be needed to allow the UE to begin semi-persistent CSI reporting. In some cases, a dynamic trigger from gNB to UE may be needed to command the UE to stop the semi-persistent transmission of CSI reports.

Generally, a CSI report setting contains the parameters associated with CSI reporting including the type of CSI reporting.

In NR, the following three types of CSI-RS transmissions are supported:

Periodic CSI-RS (P CSI-RS): CSI-RS is transmitted periodically in certain slots. This CSI-RS transmission is semi-statically configured using parameters such as CSI-RS resource, periodicity and slot offset. For CSI acquisition, a single semi-persistent CSI-RS resource is contained within a CSI-RS resource set Aperiodic CSI-RS (AP CSI-RS): This is a one-shot CSI-RS transmission that can happen in any slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH. The triggering may also include selecting a CSI-RS resource from multiple CSI-RS resources. Multiple aperiodic CSI-RS resources can be grouped into a CSI-RS resource set.

Semi-Persistent CSI-RS (SP CSI-RS): Similar to periodic CSI-RS, resources for semi-persistent CSI-RS transmissions are semi-statically configured with parameters such as periodicity and slot offset. However, unlike periodic CSI-RS, dynamic signaling is needed to activate and possibly deactivate the CSI-RS transmission.

For CSI acquisition, a single semi-persistent CSI-RS resource is contained within a CSI-RS resource set.

In the case of aperiodic CSI-RS and/or aperiodic CSI reporting, the gNB RRC configures the UE with $S_c$ CSI triggering states. Each triggering state contains the aperiodic CSI report setting to be triggered along with the associated aperiodic CSI-RS resource sets.

When the DCI contains a CSI request field with N bits, aperiodic CSI-RS and/or aperiodic CSI reporting can be triggered according to the following conditions:

Condition 1: When the number of triggering states $S_c \leq 2^N - 1$, MAC CE activation/deactivation is not used and DCI will trigger one out of the $S_c$.

Condition 2: When the number of triggering states $S_c > 2^N - 1$, MAC CE activation is used to activate $2^N - 1$ triggering states. Then, DCI will trigger the aperiodic CSI-RS and/or aperiodic CSI reporting associated with one out of the $2^N - 1$ triggering states. MAC CE can deactivate the currently active triggering states and activate a new set of $2^N - 1$ triggering states.

In NR, the size of the CSI request field is configurable and can take on values of $N = \{0, 1, 2, \ldots, N_{max}\}$. The value of $N_{max}$ is still under discussion in 3GPP and is expected to be down-selected from one of the candidate values of $\{3, 4, 5, 6, 7, 8\}$.

In the case of semi-persistent CSI-RS, the gNB first RRC configures the UE with the semi-persistent CSI-RS resources (as noted above, for CSI acquisition, a single semi-persistent CSI-RS resource is contained within a CSI-RS resource set). The semi-persistent CSI-RS resource or semi-persistent CSI-RS resource set is then activated via a MAC CE.

Quasi co-location (QCL) is a natural way to describe the relation between two different signals originating from the same transmission point and that can be received using the same spatial receiver parameters. As an example, the UE should be able to assume it can use the same receive beam when receiving the two difference signals that have spatial QCL. The spatial QCL relations between different types of reference RS and target RS are shown in the table below. Also, shown in the table are the associated signaling methods. The last column of the table simply indicates that the target and reference RSs can belong to different component carriers (CCs) and different bandwidth parts (BWPs).

| QCL parameter | Reference RS | Target RS | Signaling method | Reference RS and Target RS should belong to the same CC/BWP or not |
|---|---|---|---|---|
| Spatial | SS Block (SSB) | P CSI-RS | RRC | Can be on different CCs/BWPs |
| Spatial | SSB | SP CSI-RS | SP CSI-RS activation signal | Can be on different CCs/BWPs |
| Spatial | P CSI-RS | Another P CSI-RS | RRC | Can be on different CCs/BWPs |
| Spatial | SSB or P/SP CSI-RS | AP CSI-RS | RRC or RRC + MAC CE for configuration, indication with DCI | Can be on different CCs/BWPs |

SUMMARY

MAC CEs for NR have not been defined yet. One option is to use different MAC CEs for the following:

activation of a SP CSI-RS with QCL reference;
update of QCL reference for a SP CSI-RS;
activation of CSI triggering states containing aperiodic CSI reporting and/or aperiodic CSI-RS resource sets.

However, this can result in large signaling overhead. Hence, there is room for signaling improvements.

Hence, according to some embodiments, a MAC CE for SP CSI-RS resource activation may be defined which may be used to both activate a SP CSI-RS resource and give the SSB QCL reference for that resource, or in an efficient manner, only update the SSB QCL indication for that resource. Additionally, or alternatively, the same MAC CE could also be used to activate CSI triggering states containing aperiodic CSI reporting and/or aperiodic CSI-RS resource sets.

According to some embodiments, a MAC CE for SP CSI-RS resource activation may be defined which may be used to both activate a SP CSI-RS resource and give the QCL indication as TCI state for that resource, or in an efficient manner, only update the QCL indication as TCI state for that resource.

According to one aspect, some embodiments include a method performed by a radio network node. The method generally comprises generating a medium access control, MAC, message comprising a first field indicating whether a second field is present, or absent, in the MAC message, the second field identifying one or more resource sets among a plurality of resource sets which are to be activated or deactivated, and a third field comprising quasi co-location, QCL, information, and transmitting the generated MAC message to a wireless device.

In some embodiments, when the first field indicates that the second field is present, the third field comprises quasi co-location, QCL, information for each of the one or more resource sets identified in the second field.

In some embodiments, the resource sets may be measurement resource sets. In some embodiments, the measurement resource sets may be channel state information, CSI, measurement resource sets.

In some embodiments, the resource sets may be reference signal resource sets. In some embodiments, the reference signal resource sets may be channel state information, CSI, reference signal resource sets.

In some embodiments, the QCL information may comprise one or more synchronization signal block, SSB, indices, or one or more transmission configuration indication, TCI, indices.

In some embodiments, the first field may comprise one or two bits. In some embodiments, the first field may consist of one or two bits. In some embodiments, the second field may a bit string comprising a plurality of bits. In some embodiments, the third field may be a bit string comprising a plurality of bits.

In some embodiments, the MAC message may be a MAC control element, MAC CE.

In some embodiments, the method may comprise, of further comprise, determining which one or more resource sets to activate among the plurality of resource sets prior to generating the MAC message.

In some embodiments, the method may comprise, of further comprise, obtaining the QCL information prior to generating the MAC message.

According to another aspect, some embodiments include a radio network node adapted, configured, enabled, or otherwise operable, to perform one or more of the described radio network node functionalities (e.g. actions, operations, steps, etc.).

In some embodiments, the radio network node may comprise one or more transceivers, one or more communication interfaces, and processing circuitry operatively connected to the one or more transceivers and to the one or more communication interfaces. The one or more transceivers are configured to enable the radio network node to communicate with one or more wireless devices over a radio interface. The one or more communication interfaces are configured to enable the radio network node to communicate with one or more other radio network nodes (e.g., via a radio access network communication interface), with one or more core network nodes (e.g., via a core network communication interface), and/or with one or more other network nodes. The processing circuitry is configured to enable the radio network node to perform one or more of the described radio network node functionalities. In some embodiments, the processing circuitry may comprise at least one processor and at least one memory, the memory storing instructions which, upon being executed by the processor, configure the at least one processor to enable the radio network node to perform one or more of the described radio network node functionalities.

In some embodiments, the radio network node may comprise one or more functional units (also referred to as modules) configured to perform one or more of the described radio network node functionalities. In some embodiments, these functional units may be embodied by the one or more transceivers and the processing circuitry of the radio network node.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the radio network node, they enable the radio network node to perform one or more of the described radio network node functionalities.

According to another aspect, some embodiments include a method performed by a wireless device. The method generally comprises receiving a MAC message from a radio network node, and decoding the received MAC message, the MAC message comprising a first field indicating whether a second field is present, or absent, in the MAC message, the second field identifying one or more resource sets among a plurality of resource sets which are to be activated or deactivated, and a third field comprising quasi co-location, QCL, information.

In some embodiments, when the first field indicates that the second field is present, the third field comprises quasi co-location, QCL, information for each of the one or more resource sets identified in the second field.

In some embodiments, the resource sets may be measurement resource sets. In some embodiments, the measurement resource sets may be channel state information, CSI, measurement resource sets.

In some embodiments, the resource sets may be reference signal resource sets. In some embodiments, the reference signal resource sets may be channel state information, CSI, reference signal resource sets.

In some embodiments, the QCL information may comprise one or more synchronization signal block, SSB, indices, or one or more transmission configuration indication, TCI, indices.

In some embodiments, the first field may comprise one or two bits. In some embodiments, the first field may consist of one or two bits. In some embodiments, the second field may a bit string comprising a plurality of bits. In some embodiments, the third field may be a bit string comprising a plurality of bits.

In some embodiments, the MAC message may be a MAC control element, MAC CE.

In some embodiments, the method may comprise, or further comprise, when the first field indicates that the second field is present, activating or deactivating the one or more resource sets identified in the second field.

According to another aspect, some embodiments include a wireless device adapted, configured, enabled, or otherwise operable, to perform one or more of the described wireless device functionalities (e.g. actions, operations, steps, etc.).

In some embodiments, the wireless device may comprise one or more transceivers and processing circuitry operatively connected to the one or more transceivers. The one or more transceivers are configured to enable the wireless device to communicate with one or more radio network nodes over a radio interface. The processing circuitry is configured to enable the wireless device to perform one or more of the described wireless device functionalities. In some embodiments, the processing circuitry may comprise at least one processor and at least one memory, the memory storing instructions which, upon being executed by the processor, enable the wireless device to perform one or more of the described wireless device functionalities.

In some embodiments, the wireless device may comprise one or more functional units (also referred to as modules) configured to perform one or more of the described wireless device functionalities. In some embodiments, these functional units may be embodied by the one or more transceivers and the processing circuitry of the wireless device.

According to another aspect, some embodiments include a computer program product. The computer program product comprises computer-readable instructions stored in a non-transitory computer-readable storage medium of the computer program product. When the instructions are executed by processing circuitry (e.g., at least one processor) of the wireless device, they enable the wireless device to perform one or more of the described wireless device functionalities.

Some embodiments may enable reduction in MAC CE payload overhead when compared to using different MAC CE messages for each of activation of a SP CSI-RS with QCL reference, update of QCL reference for a SP CSI-RS, and activation of CSI triggering states containing aperiodic CSI reporting and/or aperiodic CSI-RS resource sets.

This summary is not an extensive overview of all contemplated embodiments and is not intended to identify key or critical aspects or features of any embodiments or to delineate any embodiments. Other aspects and features will become apparent to those ordinarily skilled in the art upon review of the following description of specific embodiments with the figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. These concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

In the specification, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

Figure 1:
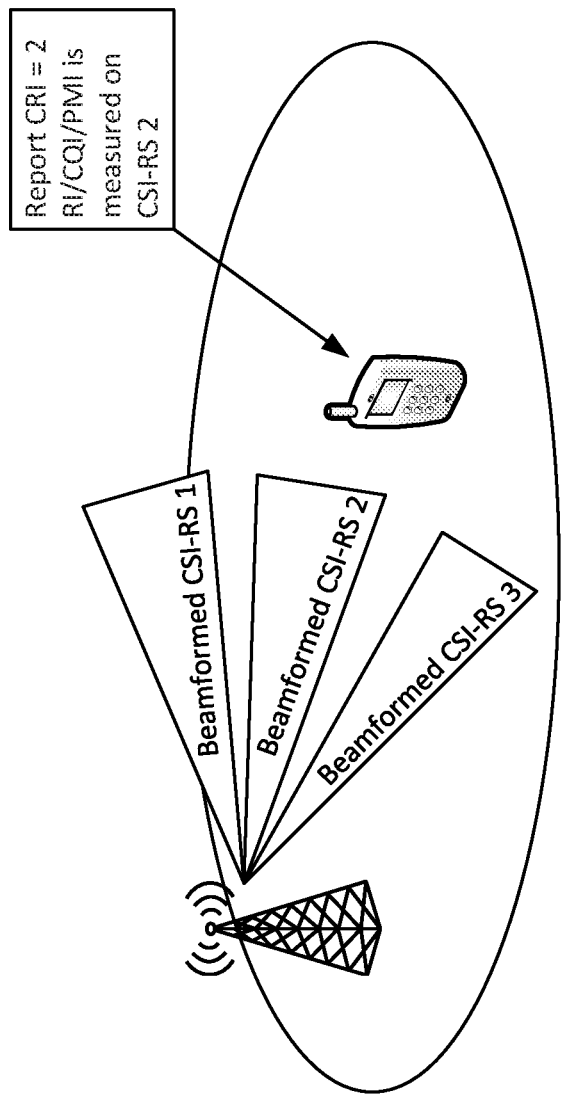
FIG. 1 is an illustration of beamformed CSI-RS.
Figure 2:
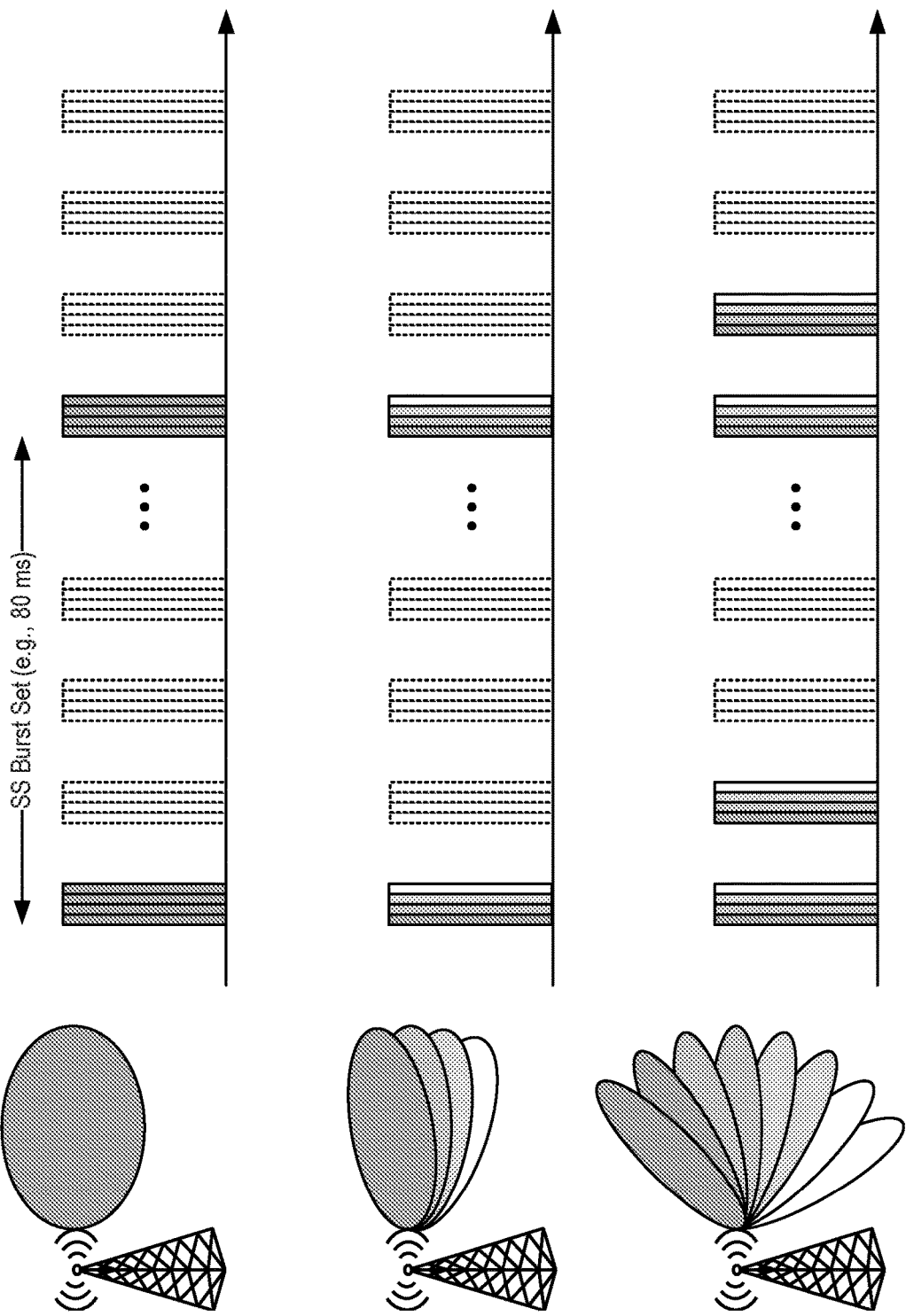
FIG. 2 is a schematic diagram of examples of different configurations of an SS Burst Set. Top: Time-repetition within one SS Burst in a wide beam. Middle: Beam-sweeping of a small number of beams using only one SS Burst in the SS Burst Set. Bottom: Beam-sweeping of a larger number of beams using more than one SS Burst in the SS Burst Set to form a complete sweep.
Figure 3:
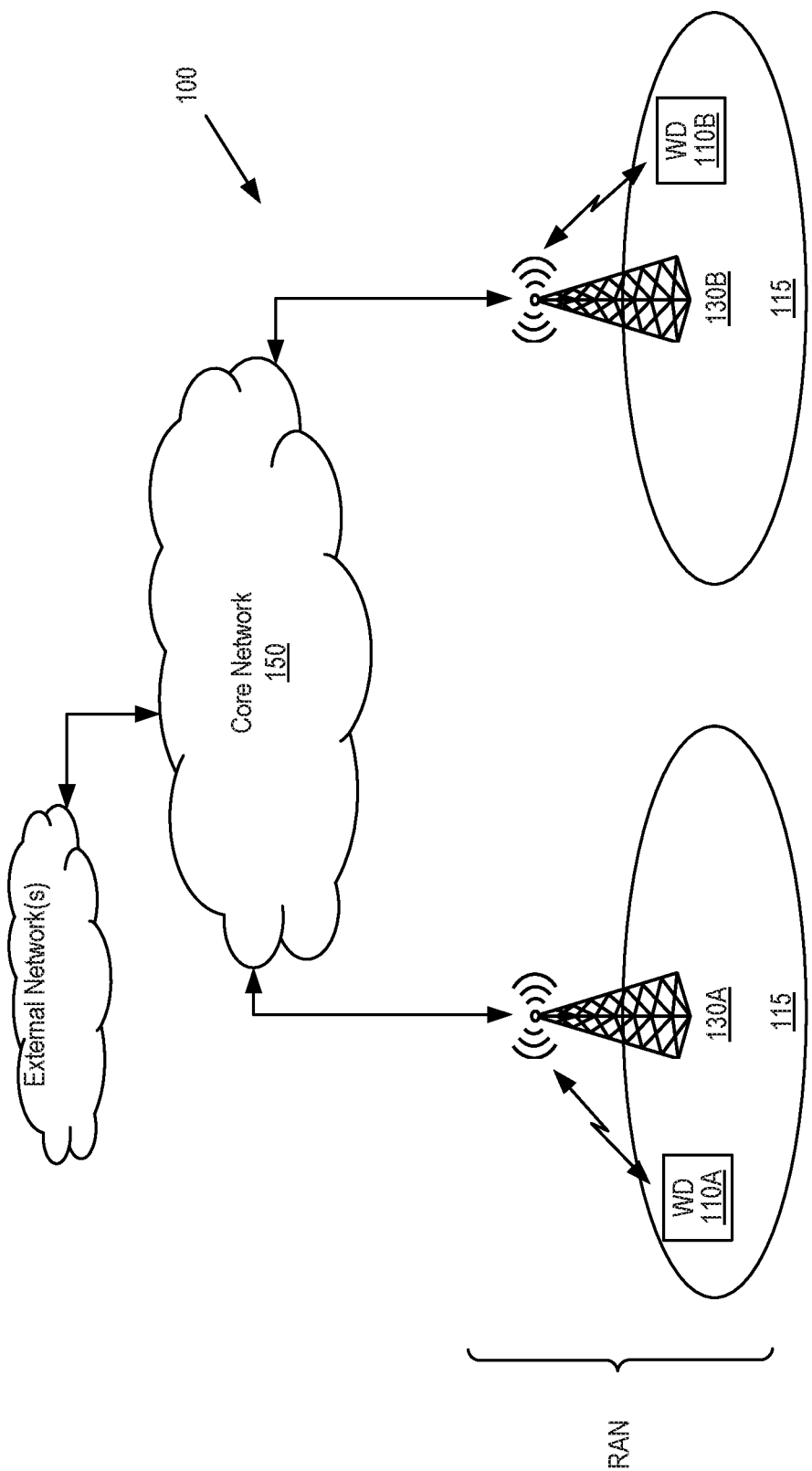
FIG. 3 is a schematic diagram of an example communication network according to some embodiments.

FIG. 3 illustrates an example of a wireless network 100 that may be used for wireless communications. Wireless network 100 includes WDs 110A-110B (collectively referred to as wireless device or wireless devices 110) and a plurality of radio network nodes 130A-130B (e.g., NBs and/or RNCs in UMTS, eNBs in LTE, gNBs in NR, etc.) (collectively referred to as radio network node or radio network nodes 130) directly or indirectly connected to a core network 150 which may comprise a plurality of core network nodes (e.g., SGSNs and/or GGSNs in UMTS, MMES, SGWs, and/or PGWs in LTE/EPC, AMFs, SMFs, and/or UPFs in NGC, etc.) (collectively referred to as core network node or core network nodes). The wireless network 100 may use any suitable radio access network (RAN) deployment scenarios, including UMTS Terrestrial Radio Access Network, UTRAN, Evolved UMTS Terrestrial Radio Access Network, EUTRAN, and Next Generation Radio Access Network, NG-RAN. UEs 110 within coverage areas 115 may each be capable of communicating directly with radio network nodes 130 over a wireless interface. In certain embodiments, UEs may also be capable of communicating with each other via device-to-device (D2D) communication.

As an example, wireless device 110A may communicate with radio network node 130A over a wireless interface. That is, wireless device 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

Broadly, the serving cell, e.g., a cell 115, of a wireless device, e.g., WD 110A, has L SSBs out of which a subset may be configured for the wireless device to be considered as potential QCL reference. Additionally, a wireless device may be configured with M CSI-RS resources or CSI-RS resource sets each having an identification (ID). Here, M has a specified maximum value. SSBs also have IDs which are represented, in some embodiments, by a maximum of 6 bits. The maximum number of bits required to represent the IDs for CSI-RS resources or CSI-RS resource sets is still open. The maximum number of bits required to represent the CSI-RS resource or CSI-RS resource set IDs is denoted by X.

Two main scenarios are considered.

Scenario 1: MAC CE for SP CSI-RS Resource Activation with SSB QCL Reference

When a SP CSI-RS resource is activated, a similar approach as for Rel-14 eFD-MIMO can be used. The radio network node (e.g., a gNB) can RRC configure (i.e., configure with RRC signaling) a certain number of SP NZP CSI-RS resources out of which an activatedMax number of resources can be activated simultaneously by MAC CE. As more than one resource can be activated at the same time, a bitmap of size maxSPResource may be needed.

As the activated SP CSI-RS resource may also need a QCL assumption, the QCL assumption could be indicated in the same MAC CE by giving the QCL reference. For this, there are two options. According to a first option, a TCI state could be indicated. According to a second option, an SSB index could be indicated. The number of bits needed to indicate a TCI state may be 2 or 3 (depending on the agreement reached by the 3GPP RAN1 working group) and up to 6 bits for SSB index. The downside of using TCI state is that options for SSBs are less as each TCI state includes one RS and that RS may be SSB or CSI-RS. Thus, to be able to refer to any SSB, the SSB ID may preferred over TCI ID.

In order to be able to update the QCL reference with a one or more octet(s) MAC CE that is smaller than the MAC CE used for both activating RSs and updating QCLs, one bit (i.e., a first field) is used to indicate whether the field (i.e., a second field) for SP CSI-RS resource activation is present or not. When the field for SP CSI-RS resource activation is not present, the MAC CE may contain, after the first bit A1/R1, QCL references for all currently active RSs (i.e., a third field). If, on the contrary, the field for SP CSI-RS resource activation is present, the MAC CE contains, possibly after the first bit A1/R1 or after the second field, QCL references for the RSs to be activated (i.e., the third field).

To indicate QCL assumption, the wireless device would receive a MAC CE where the first bit $R_1$ indicates one of the following two possibilities:

(1) the MAC CE both activates an SP CSI-RS resource and gives the SSB QCL reference for that resource (for instance, when $R_1=1$)

(2) the MAC CE only updates the SSB QCL reference for that resource (for instance, when $R_1=0$).

If one SP CSI-RS resource is activated or if the SSB QCL reference for one SP CSI-RS resource is updated, bits $R_2$ to $R_7$ are used to give the corresponding SSB index. Then, bits $R_8$ to $R_n$ in the bitmap are used to point to the one SP CSI-RS resource among maxSPResource resources which is either activated or has its SSB QCL reference updated. Depending on the size of maxSPResource, $R_n$ may be in the same octet as $R_1$ or in a different octet.

If up to activatedMax SP CSI-RS resources are activated simultaneously or if the SSB QCL references for up to activatedMax SP CSI-RS resources are to be updated, then bits $R_2$ to $R_{6*activatedMax+1}$ are used to point to the SSB indices representing the QCL references to the activatedMax SP CSI-RS resources. Depending on the size of activatedMax, $R_{6*activatedMax+1}$ may be in the same octet as $R_1$ or in a different octet. Then, bits $R_{6*activatedMax+2}$ to $R_{6*activatedMax+maxSPResource+1}$ are used to point to up to activatedMax out of the maxSPResource resources which are either activated or have their SSB QCL references updated. Depending on the size of maxSPResource and activatedMax, bits $R_{6*activatedMax+2}$ to $R_{6*activatedMax+maxSPResource+1}$ may be in the same octet as $R_1$ or in different octets.

In some embodiments, instead of SSB indices, TCI indices could be used in the above examples.

Figure 12:
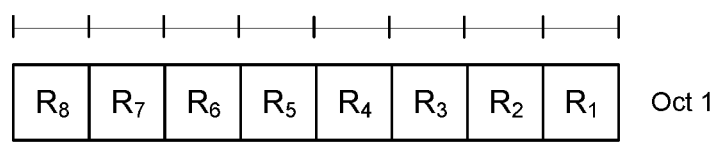

FIG. 12 only shows the first octet although the examples in Scenario 1 may involve more than one octet in the same MAC CE depending on the values of activatedMax and maxSPResource.

Scenario 2: MAC CE for SP CSI-RS Resource Activation and CSI Triggering State Activation In this scenario, the same MAC CE involving one or more octets is used to activate SP CSI-RS resources and also to activate CSI triggering states containing aperiodic report settings and/or aperiodic CSI-RS resource sets. This scenario assumes that maxSPResource is the maximum number SP CSI-RS resources configured at the wireless device by the radio network node (e.g., gNB). The parameter activatedMax denotes the maximum number of SP CSI-RS resources that can be simultaneously activated and the parameter maxCSITriggerstates (denoted as $S_c$ above) indicates the maximum number of CSI triggering states configured at the wireless device by the radio network node. In this scenario, the first two bits $R_1$-$R_2$ in the first octet are jointly used to differentiate between the following cases:

Case 1: SP CSI-RS resource(s) is/are activated with SSB QCL reference (for example when $R_1$=0 and $R_2$=0)

Case 2: SSB QCL reference for SP CSI-RS resource updated (for example when $R_1$=0 and $R_2$=1)

Case 3: Activate up to $2^N-1$ CSI triggering states out of maxCSITriggerstates when condition 2 above is met (for example when $R_1$=1 and $R_2$=0).

Case 4: No activation or update are performed (for example when $R_1$=1 and $R_2$=1)

In Case 1, the remaining bits in the MAC CE may be interpreted as follows:

Bits $R_3$ to $R_{6*activatedMax+2}$ are used to point to the SSB indices representing the QCL references to the up to activatedMax SP CSI-RS resources that are activated. Depending on the size of activatedMax, $R_{6*activatedMax+2}$ may be in the same octet as $R_1$ or in a different octet.

Bits $R_{6*activatedMax+3}$ to $R_{6*activatedMax+maxSPResource+2}$ are used to point to up to activatedMax out of the maxSPResource SP CSI-RS resources which are activated. Depending on the size of maxSPResource and activatedMax, bits $R_{6*activatedMax+3}$ to $R_{6*activatedMax+maxSPResource+2}$ may be in the same octet as $R_1$ or in different octets.

In Case 2, the remaining bits in the MAC CE may be interpreted as follows:

Bits $R_3$ to $R_{6*activatedMax+2}$ are used to point to the SSB indices representing the QCL references which are to be updated for up to activatedMax SP CSI-RS resources. Depending on the size of activatedMax, $R_{6*activatedMax+2}$ may be in the same octet as $R_1$ or in a different octet.

Bits $R_{6*activatedMax+3}$ to $R_{6*activatedMax+maxSPResource+2}$ are used to point to up to activatedMax out of the maxSPResource SP CSI-RS resources which have their SSB QCL references updated. Depending on the size of maxSPResource and activatedMax, bits $R_{6*activatedMax+3}$ to $R_{6*activatedMax+maxSPResource+2}$ may be in the same octet as $R_1$ or in different octets.

In Case 3, the remaining bits in the MAC CE may be interpreted as follows:

Bits $R_3$ to $R_{maxCSITriggerstates+2}$ are used to activate up to $2^N-1$ CSI trigger states out of the maxCSITriggerstates CSI trigger states. Depending on the size of maxCSITriggerstates, $R_{maxCSITriggerstates+2}$ may be in the same octet as $R_1$ or in a different octet.

Figure 4:
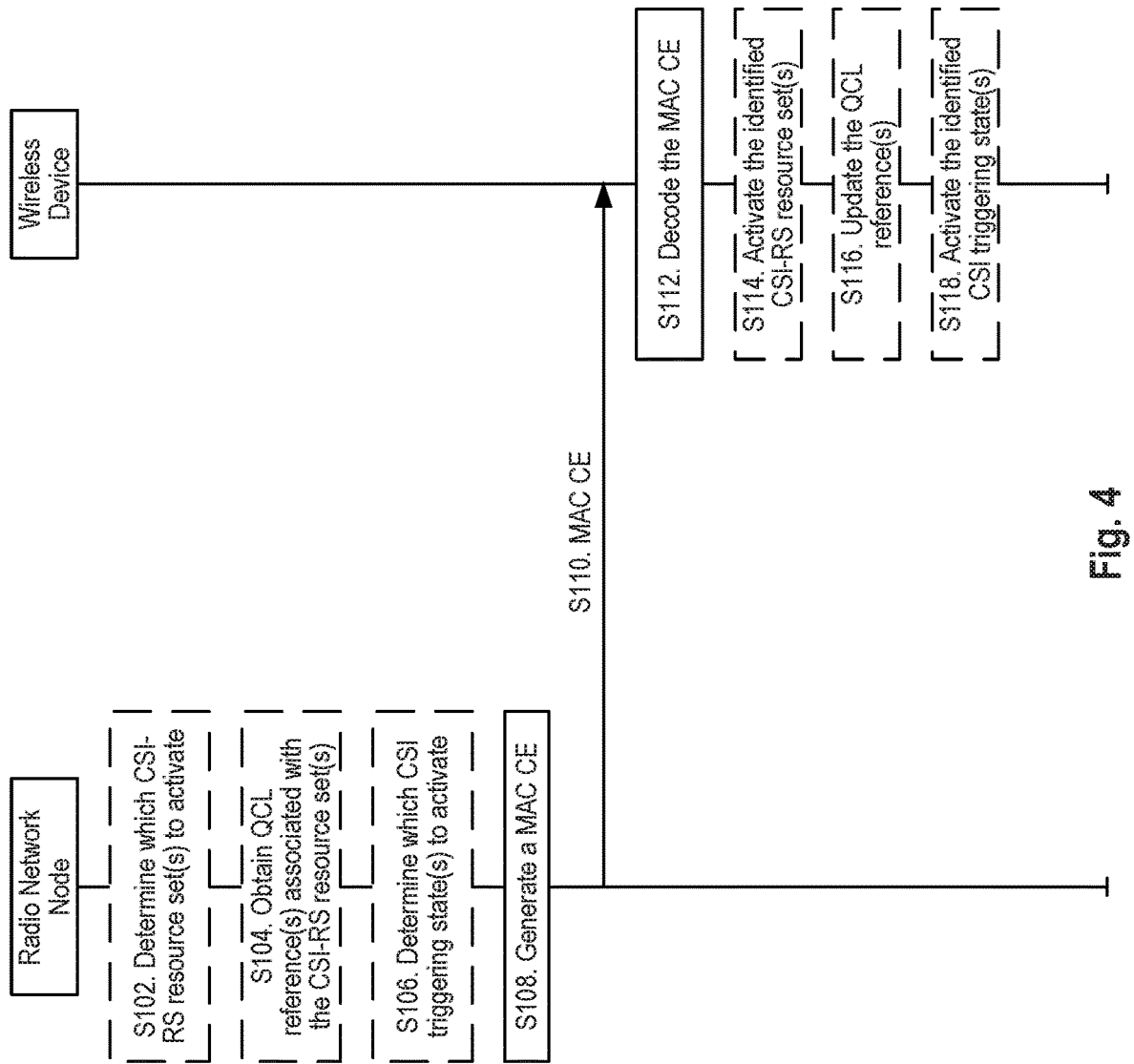
FIG. 4 is a signaling diagram according to some embodiments.

Referring to FIG. 4, a high-level signaling and operating diagram according to some embodiments is illustrated. The signaling and operating diagram of FIG. 4 assumes that the wireless device as already been configured with one or more CSI-RS resource sets.

As shown, the radio network node optionally determines, and identifies, which one of the one or more CSI-RS resource sets to activate (action S102). As it will be understood, if no CSI-RS resource sets need to be activated, e.g., because the CSI-RS resource set(s) already activated are sufficient, the radio network node may make such a determination and identify no CSI-RS resource sets to be activated. Then, the radio network node obtains QCL information or references for the CSI-RS resources sets. The QCL information or references the radio network node obtains generally depends on whether the radio network node has previously identified CSI-RS resource sets to activate. If the radio network node has not identified one or more CSI-RS resource sets to activate, the radio network node obtains QCL information or references for all the CSI-RS resource sets which are already activated at the wireless device. Otherwise, the radio network node obtains QCL information or references for the one or more CSI-RS resource sets which the radio network node has identified to be activated. In some embodiments, the radio network node may additionally, or alternatively, determine which, if any, CSI triggering state(s) to activate at the wireless device (action S106).

The radio network node then generates a MAC message to be transmitted toward the wireless device (action S108). In some embodiments, the MAC message generally comprises a first field indicating whether at least a second field is present, or absent, in the MAC message, the second field being configured to identify the one or more CSI-RS resource sets among the plurality of CSI-RS resource sets which are to be activated, and a third field comprising QCL information. Here, the content of the MAC message will vary depending on whether the radio network node has identified one or more CSI-RS resource sets to be activated. If the radio network node has not identified any CSI-RS resource sets to be activated, then the radio network node will populate the first field of the MAC message such that the second field will not be present (as there are no CSI-RS resource sets to be identified). In such the case, the radio network node will populate the third field with QCL information associated with the CSI-RS resource sets already activated at the wireless device. However, if the radio network node has identified one or more CSI-RS resource sets to be activated, the radio network node will populate the first field of the MAC message such that the second field will be present (as there are one or more CSI-RS resource sets to be identified). Then, in such a case, the radio network node will populate the third field with QCL information associated with the CSI-RS resource sets to be activated and identified in second field.

In embodiments where in the MAC message can also be used to activate CSI trigger states, the first field may also indicate whether a fourth field is present, or absent, in the MAC message. The fourth field is configured to identify the one or more CSI trigger states to be activated at the wireless device.

Once the MAC message has been generated, the radio network node transmits it to the wireless device (action S110).

Following the reception of the MAC message, the wireless device decodes it to extract the information it contains (action S112). If the first field of the MAC message indicates that the second field is absent, i.e., the MAC message does not carry the second field, the wireless device extracts the QCL information from the third field and updates the QCL information of the CSI-RS resource set(s) which are already activated at the wireless device (action S116). If the first field of the MAC message indicates that the second field is present, i.e., the MAC message carries the second field, the wireless device extracts, from the second field, the identification of the CSI-RS resource set(s) to be activated at the wireless device and extracts, from the third field, the QCL information associated with the CSI-RS resource set(s) to be activated. The wireless device may also activate the identified CSI-RS resource set(s) (action S114).

As indicated above, in embodiments where the MAC message can also be used to activate CSI trigger states, the first field may also indicate whether a fourth field is present, or absent, in the MAC message. In such embodiments, if the first field of the MAC message indicates that the fourth field is present, i.e., the MAC message carries the fourth field, the wireless device extracts, from the fourth field, the identification of the CSI trigger state(s) be activated at the wireless device. The wireless device may also activate the identified CSI trigger state(s) (action S118).

Figure 5:
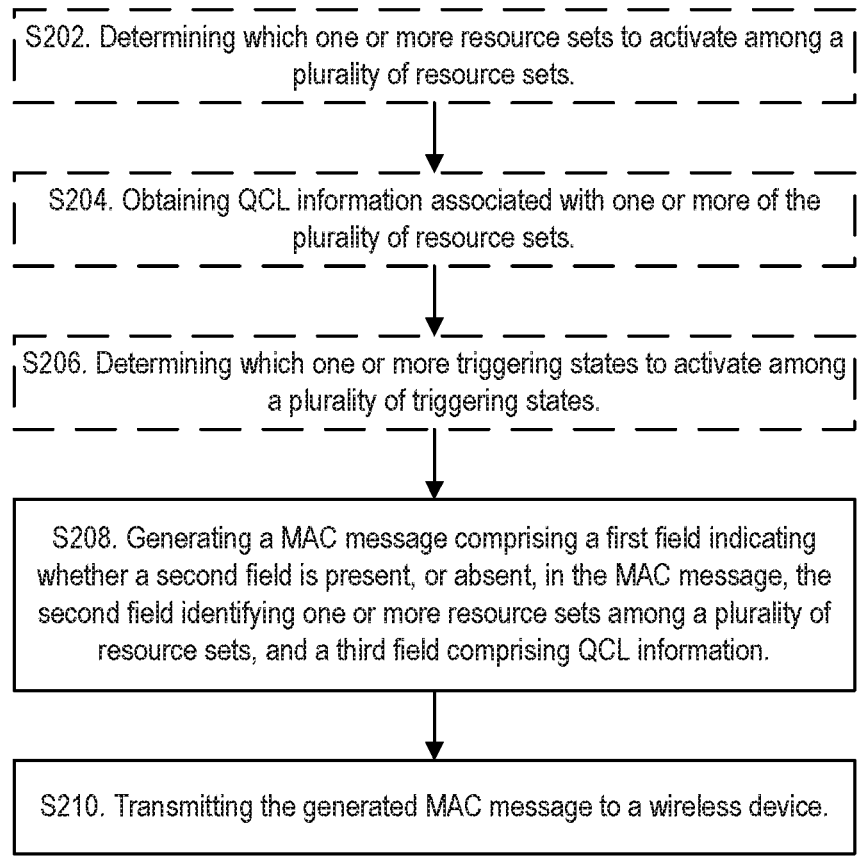
FIG. 5 is a flow chart of operations of a radio network node according to some embodiments.

FIG. 5 is a flow chart that illustrates some operations of the radio network node according to some embodiments. The actions illustrated with dashed lines may be optional, and when present, usually occur prior to the generation of the MAC message (action S208). Furthermore, even though these actions are described sequentially, some, or all, of these actions may occur substantially simultaneously. Hence, as illustrated, the radio network node determines which, if any, resource set(s) among a plurality of resource set(s) to activate (action S202). In some embodiments, the resource sets may comprise measurement resource sets (e.g., CSI measurement resource sets). In some other embodiments, the resource sets may comprise reference signal resource sets (e.g., CSI reference signal resource sets). Though not shown, determining which resource set(s) to activate among a plurality of resource set(s) may further comprise identify the one or more resource set(s) to activate. If the radio network node does not need to activate any of the plurality of resource set(s), the radio network node may omit this action. The radio network node also obtains QCL information associated with the plurality of resource set(s) (action S204). Here, the QCL information obtained by the radio network node may differ depending on whether the radio network node has determined, and identified, one or more resource sets to activate. If the radio network node has not determined, and identified, any resource sets to activate, the QCL information obtained are associated with the one or more resource sets already activated at the wireless device to which the MAC message will be sent. Otherwise, the QCL information obtained by the radio network node are associated with the one or more resource sets previously determined and identified. In some embodiments, the QCL information may be in the form of synchronization signal block, SSB, indices, or in the form of transmission configuration indication, TCI, indices.

In embodiments where the MAC message may additionally or alternatively carry the identification of the one or more triggering states to be activated at the wireless device, the radio network node may determine, and identify, the one or more triggering states to be activated at the wireless device (action S206).

At this point, the radio network node generates the MAC message, possibly in the form of a MAC control element or MAC CE, that will be transmitted to the wireless device (action S208). The MAC message generally comprises at least a first field and a third field. The MAC message may, depending on the content of the first field, comprise a second field (and in some embodiments, also a fourth field). More particularly, the first field indicates whether the second field is present, or absent, in the MAC message. In some embodiments, the first filed comprises one or two bits. In some other embodiments, the first filed consists of one or two bits. The second field, which may be a bit string comprising a plurality of bits, is configured to identify the one or more resource sets among the plurality of resource sets which are to be activated. The third field, for its part, which may also be a bit string comprising a plurality of bits, comprises QCL information. As mentioned above, the content of the MAC message will vary depending on whether the radio network node has identified one or more resource sets to be activated. If the radio network node has not identified any resource sets to be activated (e.g., in action S202), then the radio network node will populate the first field of the MAC message such that the second field will not be present (as there are no resource sets to be identified). In such a case, the radio network node will populate the third field with QCL information associated with the resource sets already activated at the wireless device. However, if the radio network node has identified one or more resource sets to be activated, the radio network node will populate the first field of the MAC message such that the second field will be present (as there are one or more resource sets to be identified). Then, in such a case, the radio network node will populate the third field with QCL information associated with the resource sets to be activated and identified in second field.

In embodiments where in the MAC message can also be used to activate trigger states, the first field may also indicate whether a fourth field is present, or absent, in the MAC message. The fourth field is configured to identify the one or more trigger states to be activated at the wireless device.

Once of the MAC message is generated, the radio network node transmits the generated MAC message toward to the wireless device (action S210).

It will be appreciated that one or more of the above steps may be performed simultaneously and/or in a different order. Also, steps illustrated in dashed lines are optional and may be omitted in some embodiments.

Figure 6:
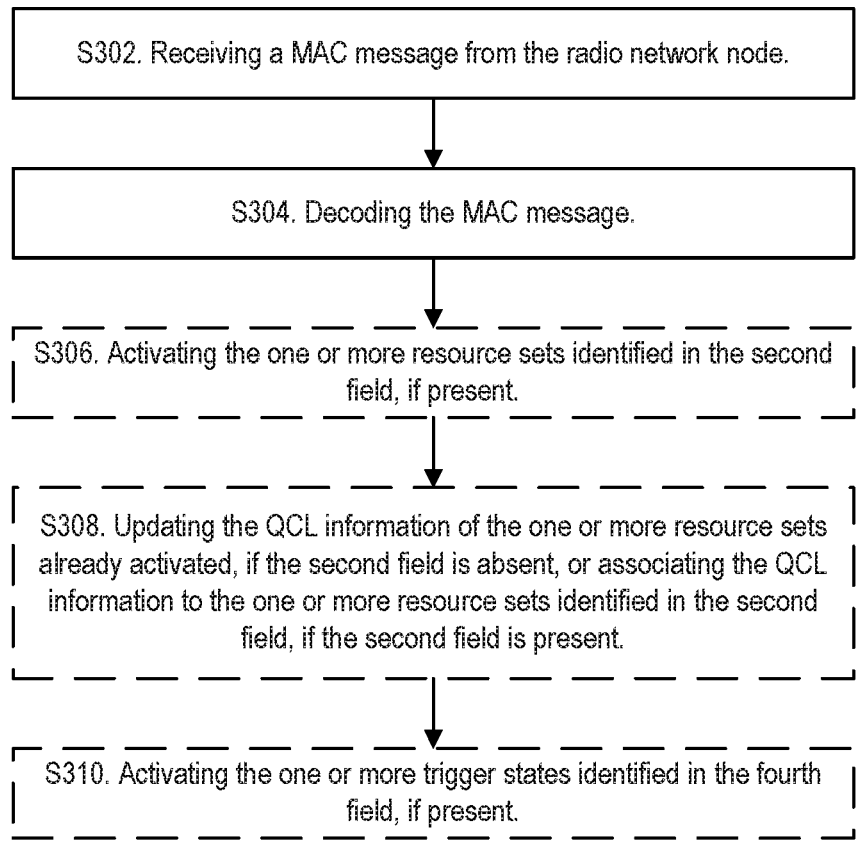
FIG. 6 is a flow chart of operations of a wireless device according to some embodiments.

FIG. 6 is a flow chart that illustrates some operations of the wireless device according to some embodiments. As illustrated, the wireless device receives a MAC message (e.g., a MAC CE) from the radio network node (action S302). The wireless device subsequently decodes the MAC message to extract the information and/or commands it contains (action S304). The MAC message received from the radio network node generally comprises at least the first field and the third field, the first field indicating whether a second field is present or absent. In some embodiments, the first field comprises one or two bits. In some other embodiments, the first field consists of one or two bits. The second field, which may be a bit string comprising a plurality of bits, is configured to identify the one or more resource sets among the plurality of resource sets which are to be activated. The third field, for its part, which may also be a bit string comprising a plurality of bits, comprises QCL information (e.g., SSB indices, TCI indices, etc.).

If the first field of the MAC message indicates that the second field is absent, i.e., the MAC message does not carry the second field, the wireless device extracts the QCL information from the third field and updates the QCL information of the resource set(s) which are already activated at the wireless device (action S308). If the first field of the MAC message indicates that the second field is present, i.e., the MAC message carries the second field, the wireless device extracts, from the second field, the identification of the resource set(s) to be activated at the wireless device and extracts, from the third field, the QCL information associated with the resource set(s) to be activated (action S308). The wireless device also activates the identified resource set(s) (action S306). In some embodiments, the resource sets may comprise measurement resource sets (e.g., CSI measurement resource sets). In some other embodiments, the resource sets may comprise reference signal resource sets (e.g., CSI reference signal resource sets).

In some embodiments, the first field may additionally or alternatively indicate whether a fourth field is present, or absent, in the MAC message. In such embodiments, if the first field of the MAC message indicates that the fourth field is present, i.e., the MAC message carries the fourth field, the wireless device extracts, from the fourth field, the identification of the trigger state(s) to be activated at the wireless device. The wireless device then activates the identified trigger state(s) (action S310).

It will be appreciated that one or more of the above steps may be performed simultaneously and/or in a different order. Also, steps illustrated in dashed lines are optional and may be omitted in some embodiments.

Figure 7:
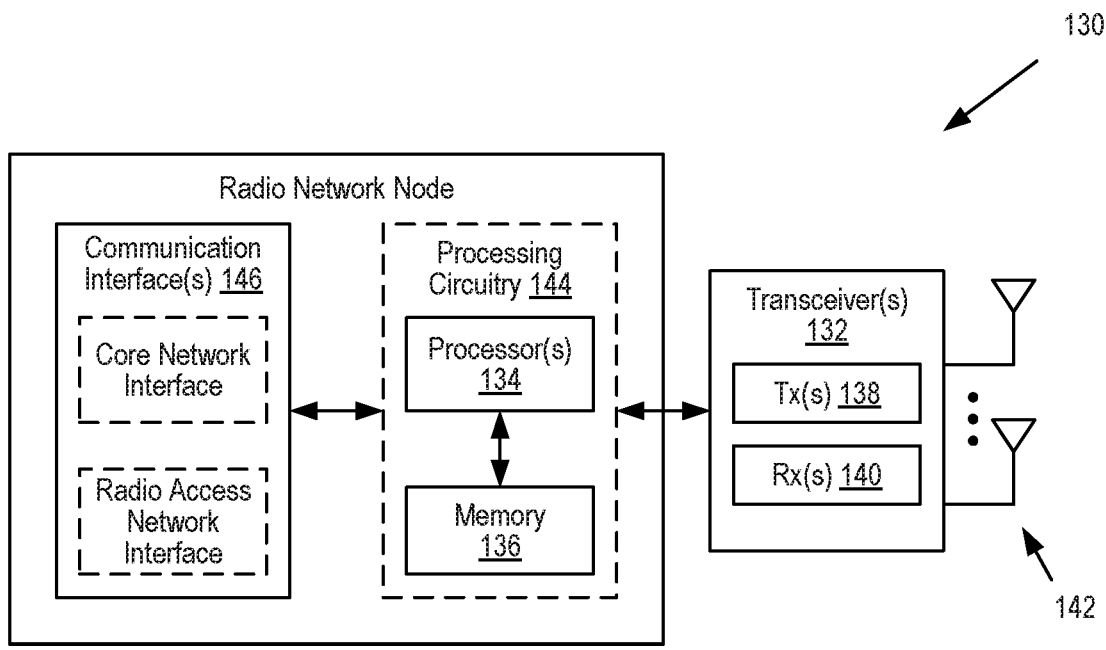
FIG. 7 is a block diagram of a radio network node according to some embodiments.

Embodiments of a radio network node 130 will now be described with respect to FIGS. 7 and 8. FIG. 7 is a block diagram of an exemplary radio network node 130, according to some embodiments. Radio network node 130 may include one or more of a transceiver 132, processor 134, memory 136, and communication interface 146. In some embodiments, the transceiver 132 facilitates transmitting wireless signals to and receiving wireless signals from wireless devices 110 (e.g., via transmitter(s) (Tx) 138, receiver(s) (Rx) 140, and antenna(s) 142). The processor 134 executes instructions to provide some or all of the functionalities described above as being provided by a radio network node 130, the memory 136 stores the instructions to be executed by the processor 134. In some embodiments, the processor 134 and the memory 136 form processing circuitry 144. The communication interface(s) 146 enable the radio network 130 to communicate with other network nodes, including other radio network nodes (via a radio access network interface) and core network nodes (via a core network interface).

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by a processor such as processor 134. Examples of memory 136 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 146 is communicatively coupled to the processor 134 and may refer to any suitable device operable to receive input for radio network node 130, send output from radio network node 130, perform suitable processing of the input or output or both, communicate to other devices, or any combination of the preceding. The communication interface may include appropriate hardware (e.g., port, modem, network interface card, etc.) and software, including protocol conversion and data processing capabilities, to communicate through a network.

Other embodiments of radio network node 130 may include additional components beyond those shown in FIG. 7 that may be responsible for providing certain aspects of the radio network node's functionalities, including any of the functionalities described above and/or any additional functionalities (including any functionality necessary to support the solutions described above). The various different types of radio network nodes may include components having the same physical hardware but configured (e.g., via programming) to support different radio access technologies, or may represent partly or entirely different physical components.

Figure 8:
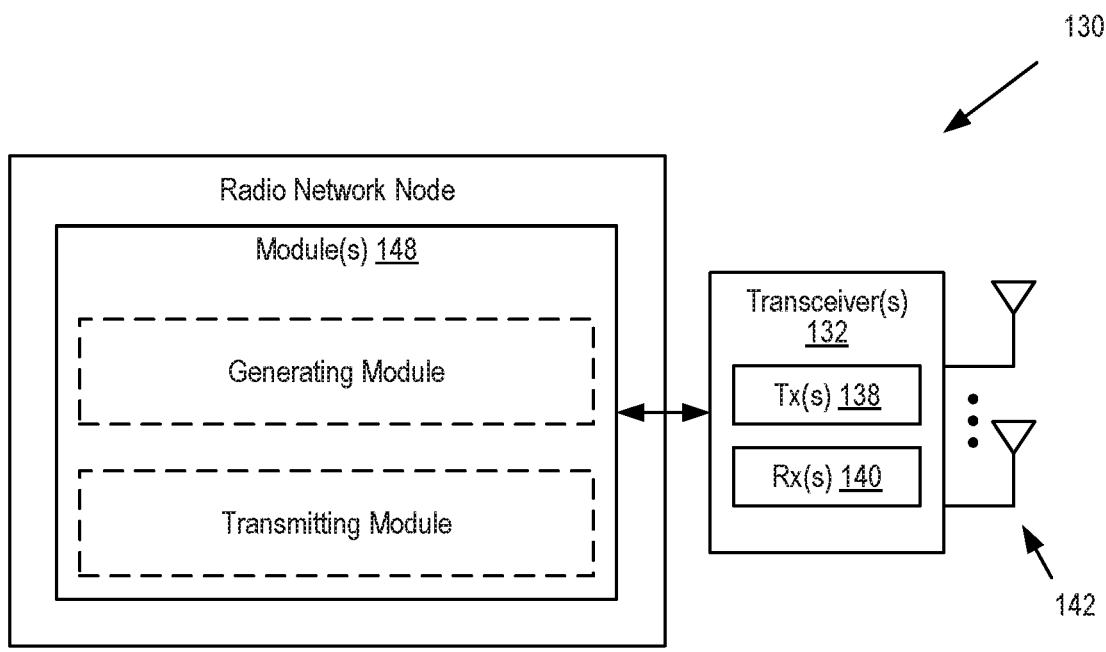
FIG. 8 is another block diagram of a radio network node according to some embodiments.

FIG. 8 is a block diagram of another exemplary radio network node 130 according to some embodiments. As illustrated, in some embodiments, the radio network node 130 may comprise a series of modules (or units) 148 configured to implement the functionalities of the radio network node 130 described above. For instance, the radio network node 130 may comprise a generating module configured to generate a MAC message, and a transmitting module configured to transmit the MAC message to a wireless device 110. It will be appreciated that the various modules 148 may be implemented as combination of hardware and/or software, for instance, the processor 134, memory 136 and transceiver(s) 132 of radio network node 130 shown in FIG. 7. Some embodiments may also include additional modules to support additional and/or optional functionalities.

Some embodiments of a wireless device 110 will now be described with respect to FIGS. 9 and 10. Even though the expression wireless device is used throughout the description, it is to be understood that the expression is used generically. In that sense, other communication standards may use different terminology when describing user equipment. For instance, in addition to User Equipment, 3GPP also used mobile terminal (MT). For its part, 3GPP2 uses the term access terminal (AT) and IEEE 802.11 (also known as WiFi™) uses the term station (STA).

Figure 9:
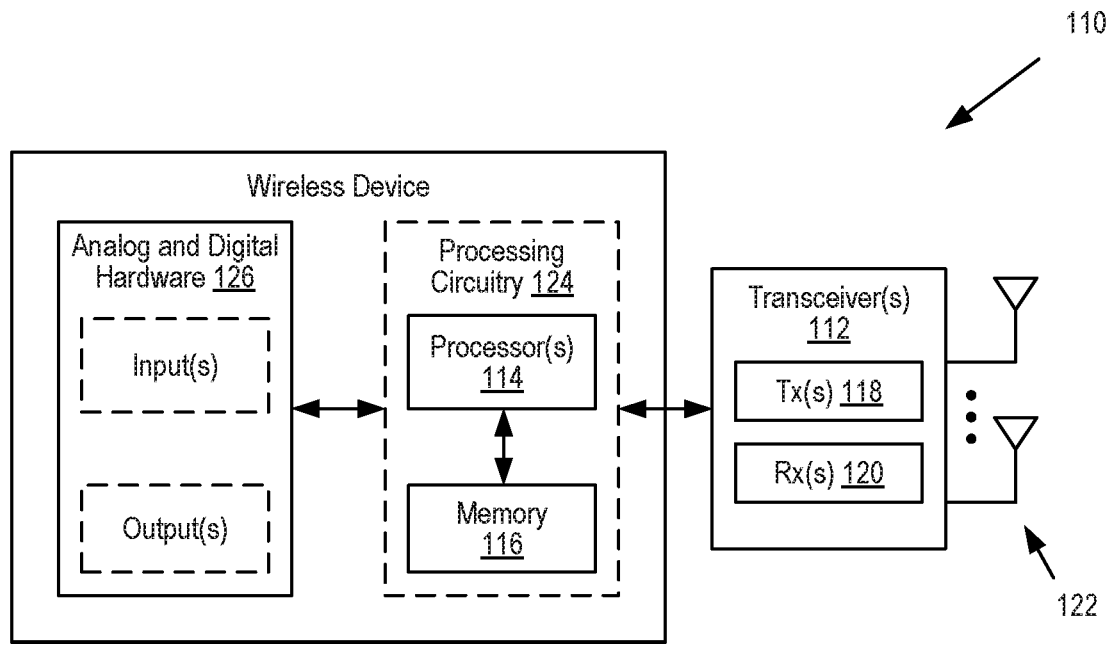
FIG. 9 is a block diagram of a wireless device according to some embodiments.

FIG. 9 is a block diagram of an exemplary wireless device 110 according to some embodiments. Wireless device 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120 and antenna(s) 122). The processor 114 executes instructions to provide some or all of the functionalities described above as being provided by wireless device 110, and the memory 116 stores the instructions to be executed by the processor 114. In some embodiments, the processor 114 and the memory 116 form processing circuitry 124.

The processor 114 may include any suitable combination of hardware to execute instructions and manipulate data to perform some or all of the described functions of wireless device 110, such as the functions of wireless device 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor such as processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of wireless device 110.

Other embodiments of wireless device 110 may include additional components beyond those shown in FIG. 9 that may be responsible for providing certain aspects of the wireless device functionalities, including any of the functionalities described above and/or any additional functionalities (including any functionality necessary to support the solution(s) described above). As just one example, wireless device 110 may include input devices and circuits, output devices, and one or more synchronization units or circuits, which may be part of the processor. Input devices include mechanisms for entry of data into wireless device 110. As an example, wireless device 110 may include additional hardware 126 such as input devices and output devices. Input devices include input mechanisms such as microphone, input elements, display, etc. Output devices include mechanisms for outputting data in audio, video and/or hard copy format. For example, output devices may include a speaker, a display, etc.

Figure 10:
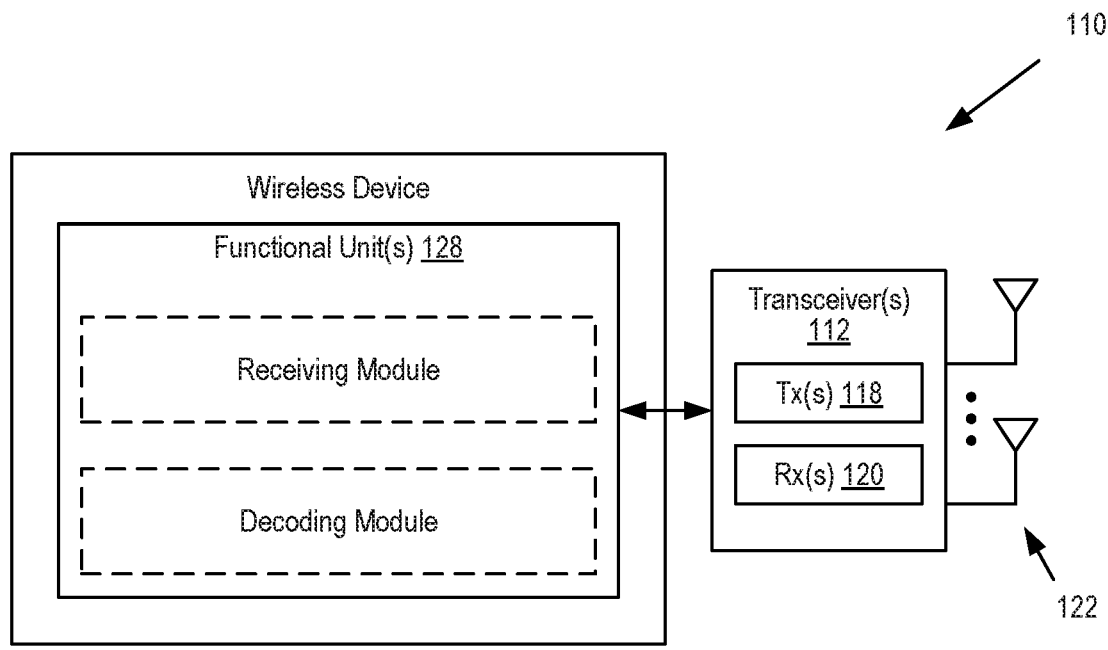
FIG. 10 is another block diagram of a wireless device according to some embodiments.
Figure 11:
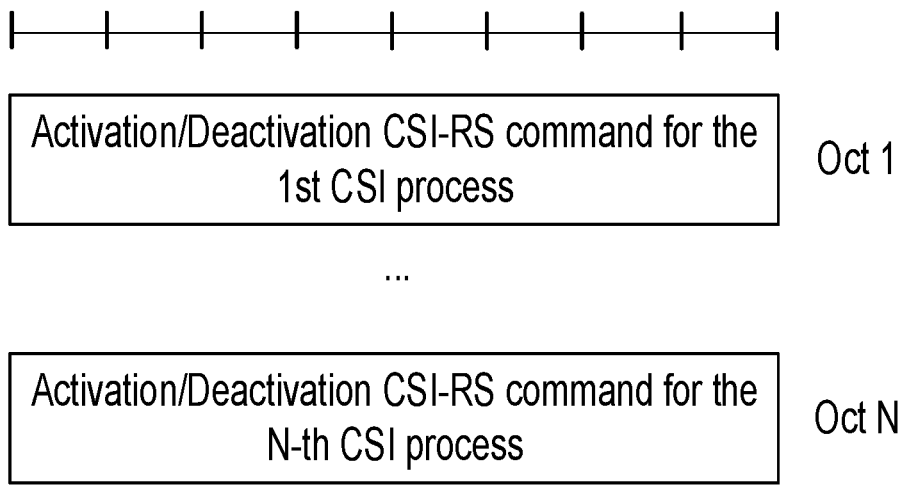
FIG. 11 illustrates an Activation/Deactivation of CSI-RS resources MAC control element and FIG. 12 illustrates an Activation/Deactivation CSI-RS command.

FIG. 10 is a block diagram of another exemplary wireless device 110 according to some embodiments. As illustrated, in some embodiments, the wireless device 110 may comprise a series of modules (or units) 128 configured to implement some or all of the functionalities of the wireless device 110 described above. For instance, the wireless devices may comprise a receiving module configured to receive the MAC message from the radio network node, and a decoding module configured to decode the received MAC message. It will be appreciated that the various modules 128 may be implemented as combination of hardware and/or software, for instance, the processor 114, memory 116 and transceiver(s) 112 of wireless device 110 shown in FIG. 9. Some embodiments may also include additional modules to support additional and/or optional functionalities.

Some embodiments may also be represented as a computer program product comprising a non-transitory machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

RELATED STANDARD REFERENCES

The following references may be related to the present description:
3GPP TS 36.321 V14.4.0
3GPP TS 36.331 V14.4.0
3GPP TS 38.321 V1.0.0
3GPP TS 38.331 V0.1.0

ABBREVIATIONS AND ACRONYMS

The present description may comprise these abbreviations and/or acronyms:

3GPP Third Generation Partnership Project
AMF Access Management Function
CE Control Element
CN Core Network
CSI Channel State Information
D2D Device-to-Device
eNB evolved Node B
EPC Evolved Packet Core
E-UTRAN Evolved Universal Terrestrial Radio Access Network
FD-MIMO Full Dimensional Multiple Input Multiple Output
GGSN Gateway GPRS Support Node
gNB Next Generation Node B (a Node B supporting NR)
LTE Long Term Evolution
MAC Medium Access Control
MME Mobility Management Entity
NB Node B
NGC Next Generation Core
NR New Radio
PGW Packet Data Network Gateway
QCL Quasi Co-Location
RAN Radio Access Network
RNC Radio Network Controller
RS Reference Signal
SGSN Serving GPRS Support Node
SGW Serving Gateway
SMF Session Management Function
SP Semi-Persistent
SSB Synchronization Signal Block
TCI Transmission Configuration Indication
UE User Equipment
UMTS Universal Mobile Telecommunications System
UPF User Plane Function
UTRAN Universal Terrestrial Radio Access Network

What is claimed is:

1. A method in a radio network node, the method comprising:
generating a medium access control (MAC) message comprising a first field indicating whether a second field is present, or absent, in the MAC message, the second field identifying one or more resource sets among a plurality of resource sets which are to be activated or deactivated, and a third field comprising quasi co-location (QCL) information;
transmitting the generated MAC message to a wireless device.

2. The method of claim 1, wherein when the first field indicates that the second field is present, the third field comprises quasi co-location (QCL) information for each of the one or more resource sets identified in the second field.

3. The method of claim 1, wherein the resource sets are measurement resource sets or reference signal resource sets.

4. The method of claim 1, wherein the QCL information comprise one or more synchronization signal block (SSB)_ indices, or one or more transmission configuration indication (TCI) indices.

5. The method of claim 1, further comprising determining which one or more resource sets to activate among the plurality of resource sets prior to generating the MAC message.

6. A radio network node adapted to:
generate a medium access control (MAC) message comprising a first field indicating whether a second field is present, or absent, in the MAC message, the second field identifying one or more resource sets among a plurality of resource sets which are to be activated or deactivated, and a third field comprising quasi co-location, (QCL) information;
transmit the generated MAC message to a wireless device.

7. The radio network node of claim 6, wherein when the first field indicates that the second field is present, the third field comprises quasi co-location (QCL) information for each of the one or more resource sets identified in the second field.

8. The radio network node of claim 6, wherein the resource sets are measurement resource sets or reference signal resource sets.

9. The radio network node of claim 6, wherein the QCL information comprise one or more synchronization signal block (SSB) indices, or one or more transmission configuration indication (TCI) indices.

10. The radio network node of claim 6, further adapted to determine which one or more resource sets to activate among the plurality of resource sets prior to generating the MAC message.

11. A method in a wireless device, the method comprising:
receiving a medium access control (MAC) message from a radio network node;
decoding the received MAC message, the MAC message comprising a first field indicating whether a second field is present, or absent, in the MAC message, the second field identifying one or more resource sets among a plurality of resource sets which are to be activated or deactivated, and a third field comprising quasi co-location (QCL) information.

12. The method of claim 11, wherein when the first field indicates that the second field is present, the third field comprises quasi co-location (QCL) information for each of the one or more resource sets identified in the second field.

13. The method of claim 11, wherein the resource sets are measurement resource sets or reference signal resource sets.

14. The method of claim 11, wherein the QCL information comprise one or more synchronization signal block (SSB) indices, or one or more transmission configuration indication (TCI) indices.

15. The method of claim 11, further comprising, when the first field indicates that the second field is present, activating or deactivating the one or more resource sets identified in the second field.

16. A wireless device adapted to:
receive a medium access control (MAC) message from a radio network node;
decode the received MAC message, the MAC message comprising a first field indicating whether a second field is present, or absent, in the MAC message, the second field identifying one or more resource sets among a plurality of resource sets which are to be activated or deactivated, and a third field comprising quasi co-location (QCL) information.

17. The wireless device of claim 16, wherein when the first field indicates that the second field is present, the third field comprises quasi co-location (QCL) information for each of the one or more resource sets identified in the second field.

18. The wireless device of claim 16, wherein the resource sets are measurement resource sets or reference signal resource sets.

19. The wireless device of claim 16, wherein the QCL information comprise one or more synchronization signal block (SSB) indices, or one or more transmission configuration indication (TCI) indices.

20. The wireless device of claim 16, further adapted to, when the first field indicates that the second field is present, activate or deactivate the one or more resource sets identified in the second field.

* * * * *